United States Patent [19]

Proksa et al.

[11] Patent Number: 4,764,536

[45] Date of Patent: Aug. 16, 1988

[54] PROCESS AND APPARATUS FOR THE PREPARATION OF A FREE-FLOWING MIXTURE MADE OF FREE-FLOWING COMPONENTS WHICH REACTS TO FORM FOAM

[75] Inventors: Ferdinand Proksa, Leverkusen; Ferdinand Althausen, Neunkirchen; Gottfried Bücher, Troisdorf; Reiner Raffel, Siegburg; Hans-Michael Sulzbach, Koenigswinter, all of Fed. Rep. of Germany

[73] Assignee: Maschinenfabrik Hennecke GmbH, Birlinghoven, Fed. Rep. of Germany

[21] Appl. No.: 3,447

[22] Filed: Jan. 15, 1987

[30] Foreign Application Priority Data

Jan. 24, 1986 [DE] Fed. Rep. of Germany ....... 3602024

[51] Int. Cl.⁴ .............................................. C08G 18/14
[52] U.S. Cl. ....................................... 521/50; 521/74; 521/99; 521/131; 521/133
[58] Field of Search ...................... 521/50, 74, 99, 131, 521/133, 155, 917

[56] References Cited

U.S. PATENT DOCUMENTS

| | | | |
|---|---|---|---|
| 4,050,896 | 9/1977 | Raffel et al. | 23/230 |
| 4,157,427 | 6/1979 | Ferber | 521/133 |
| 4,376,172 | 3/1983 | Belangee et al. | 521/133 |

FOREIGN PATENT DOCUMENTS 3244037  5/1984  Fed. Rep. of Germany .
3442954  3/1986  Fed. Rep. of Germany .

Primary Examiner—Maurice J. Welsh
Attorney, Agent, or Firm—Gene Harsh; Joseph C. Gil; Thomas W. Roy

[57] ABSTRACT

The present invention is directed to a process and apparatus for introducing gas into one of at least two free-flowing components which are subsequently mixed to provide a foam-forming free-flowing mixture by transferring the component to have gas dispersed therein from a supply container to a gas loading area, loading the component with gas and returning the component to the supply area, wherein the gas used in the gas loading area is obtained from a gas cushion maintained in the supply container and wherein the gas is compressed to a pressure higher than the pressure in the gas loading area before it is dispersed into the free-flowing component.

5 Claims, 3 Drawing Sheets

PROCESS AND APPARATUS FOR THE PREPARATION OF A FREE-FLOWING MIXTURE MADE OF FREE-FLOWING COMPONENTS WHICH REACTS TO FORM FOAM

BACKGROUND OF THE INVENTION

1. Field of the Invention

The invention is directed to a process and an apparatus for the preparation of a foam-forming, free-flowing mixture from free-flowing components which are stored in supply areas, wherein before the components enter the mixing zone at least one of the components is loaded with gas by leading this component from the supply area to a gas loading area, by gassing it there and leading it back to the supply area again, whereby in the supply area a gas cushion is maintained and the gas that is required for gas loading is taken from this gas cushion.

2. Description of the Prior Art

In the preparation of foam from free-flowing components in particular polyurethane components, the gas level in the reaction mixture has a significant influence on the course of the reaction and on the subsequent properties of the foam.

According to published application DE-A No. 3,244,037 (U.S. Ser. No. 550,428, filed Nov. 10, 1983) and unpublished application DE-A No. 3,442,954 (U.S. Ser. No. 772,964, filed Sept. 5, 1985), the U.S. Serial Nos. hereby incorporated by reference, the gas loading is carried out by means of an ejector mixer. In this process the gas, which is drawn in by the ejector mixer, may be taken from the gas cushion of the supply container directly. In the unpublished application the device i.e. in particular the gas loading unit, is structurally fitted into the whole of the installation in such a way that the section of pipe running from the gas loading unit to the supply container is so short and the size of the cross-section is so large that no loss of pressure occurs. This means that tube gassed component should flow back into the supply container.

In installations which are already available and could be adapted to this technology, problems frequently occur, however, if the required connection on the supply container does not have a large cross-section, and/or it is not possible to effect retrofitting and safety retesting of the supply containers without interrupting production. This narrow cross-section leads to a loss of pressure which makes it impossible for the gas loading unit according to DE-A No. 3,442,954 to function properly.

An object of the present invention is to create a technology which can both be integrated without any problems into installations which are already available and which can also be used in new installations such that the other advantages afforded by DE-A No. 3,442,954 are retained. These advantages include the production of an extremely fine dispersion, freedom from losses of propellants and, in particular, the regenerative effect of the gas loading element.

The solution entails compressing the gas which is taken from the supply area to a higher pressure than the pressure in the gas loading area before it is dispersed into the desired component.

Because the gas is taken to a higher pressure level the pressure loss of the fluid component between the loading area and the supply area can be compensated for as desired. With this new process it is possible to integrate the gas loading unit described in DE-A No. 3,442,954 into the installation without any problems and while retaining all of the advantages especially the regeneration of the gas loading element.

SUMMARY OF THE INVENTION

The present invention is directed to a process for introducing a gas into one of at least two free-flowing components which are subsequently mixed to provide a foam-forming, free-flowing mixture by
(a) introducing one of the free-flowing components into a supply container,
(b) maintaining a gas cushion in the supply container above the level of the one free-flowing component,
(c) pumping the one free-flowing component from the supply container to a gas loading area including a container having gas dispersing means,
(d) dispersing gas in the one free-flowing component via the gas dispersing means,
(e) pumping the one free-flowing component from the gas loading area to the supply container,
(f) transporting gas for the gas dispersing means from the gas cushion to the gas loading area and
(g) compressing the gas during the transporting of step (f) to a higher pressure than the pressure in the gas loading area.

The present invention is also directed to an apparatus for introducing a gas into one of at least two free-flowing components which is subsequently mixed to provide a foam-forming, free flowing mixture by providing
(a) a container for one of the free-flowing components, the container having a gas cushion above the liquid level of the one free-flowing component,
(b) a gas loading section including a second container having a gas dispersing device,
(c) a first conduit connecting the liquid level of the container with the gas loading section,
(d) a pump for transporting liquid from the liquid area of the container through the first conduit to the gas loading section,
(e) a second conduit running between the gas loading section and the liquid level of the container,
(f) a gas conduit connecting the gas cushion of the container with the gas loading section and
(g) a compressor located in the gas conduit.

DETAILED DESCRIPTION OF THE INVENTION

Figure 1:
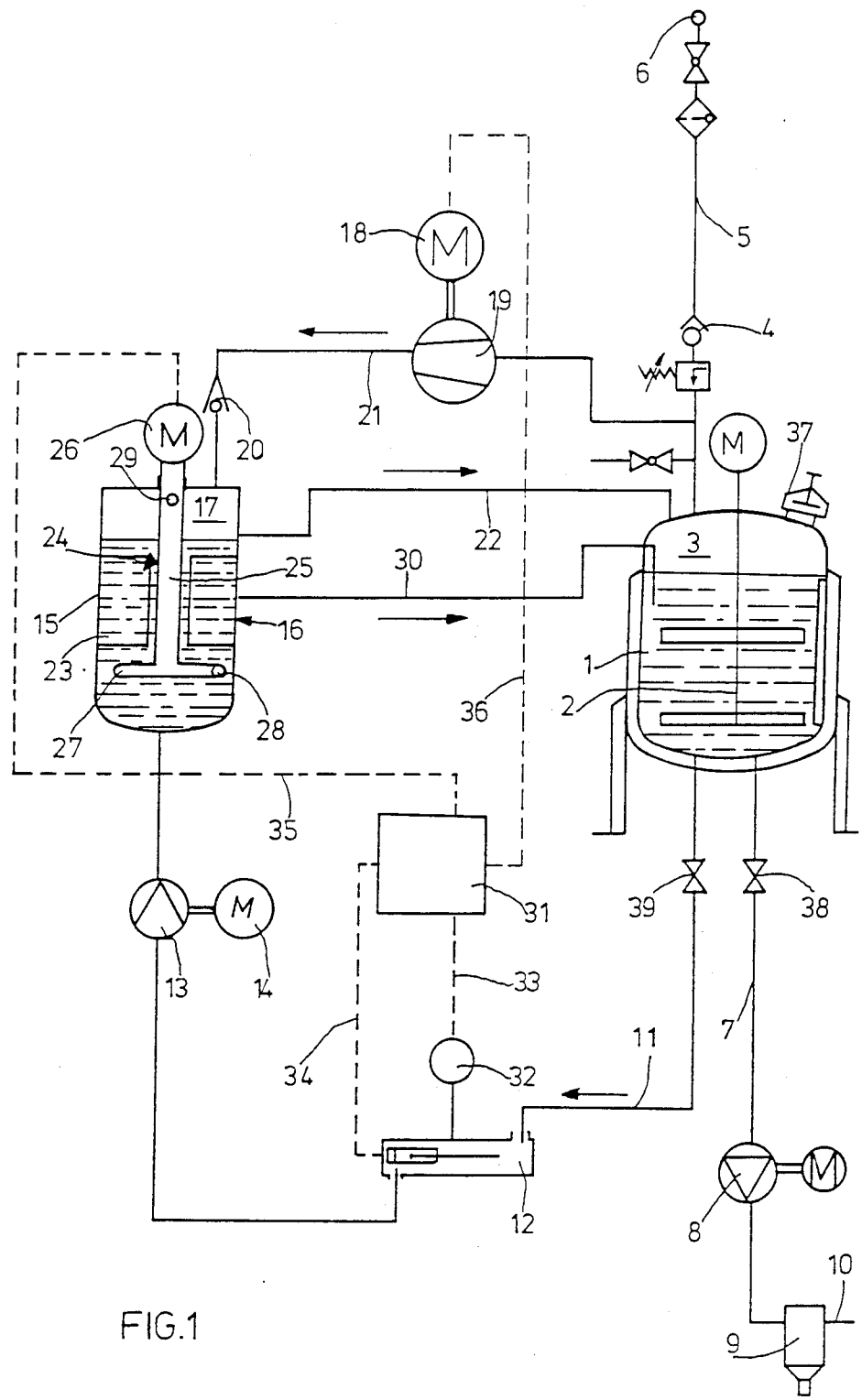
FIG. 1 shows a first embodiment of the present invention.

In order to promote self-sucking, a gas cushion is also preferably maintained in the gas loading area. The gas loading element, which disperses the gas in the quantity of components present in the gas loading area, is arranged such that it extends into the gas cushion.

In order to guarantee that a gas cushion is always present in the gas loading area it is produced and maintained according to a preferred embodiment of the new process by means of a levelling device.

According to another embodiment of the process the excess quantity of gas which has not been dispersed is returned from the gas loading area to the supply area. The return of excess gas can take place separately from the gas loaded component or together with it. In this way it is ensured that the gas cushion which is present in the gas loading area does not constantly increase in size.

According to a further development of the process the gas which has been drawn from the gas cushion of the supply area is stored for an intermediate period in a reservoir at the pressure present in the gas loading area and is lead from that reservoir to be used in the gas loading process. This step in the process has the advantage that any pressure pulsations which occur during compression are smoothed out in the reservoir.

The device for carrying out the process includes supply containers for the reaction components. At least one of these supply containers is connected with a gas loading unit having a gas loading element by means of a circulation pipe such that a pump is provided in the section of this circulation pipe leading from the supply container to the gas loading unit. A gas pipe leads from the upper part of the supply container to the gas loading unit. Previously there was no compressor located in this gas pipe. Since only relatively small quantities of gas having a low level of pressure are involved, the compressor is a relatively small device.

In the gas loading process, a hydrometer is preferably located in the device in known manner on the circulation pipe leading from the supply container to the gas loading unit. The hydrometer is also connected to the computer and control device for the gas loading process. The computer and control device is used to control both the drive of the ejector mixer (which is provided as the gas loading element) and also the drive of the compressor. A gas cushion is produced by the compressor itself in the gas loading unit from which the gas loading element can draw gas.

According to one preferred embodiment a gas return pipe runs from the gas loading unit to the supply container. The excess quantity of gas, which is not drawn into the loading unit or dispersed, is returned to the supply container through this pipe with the advantage that losses of propellant do not occur.

Preferably a levelling device is also fitted into the gas loading unit. In this way it is ensured that a gas cushion is always present in the gas loading container. According to another particular embodiment an air chamber is located between the compressor and the gassing unit so that any pulsations caused by the compressor are smoothed out.

A manometer may be fitted to the gas loading unit; the manometer is connected to a pressure control device which in turn is connected to the air chamber. The pressure in the air chamber may then be adjusted in accordance with the pressure in the gas loading unit by using the pressure control device to control the drive of the compressor.

The gas loading element is preferably an ejector mixer.

According to another embodiment a stop valve is located in the gas pipe prior to the point where gas enters via this pipe into the gas loading unit. This valve is opened when the gas loading element is working. The gas feed to the gas loading unit can also be interrupted when gas is not being loaded in the gas loading unit.

In the drawings, the new device is represented in three possible embodiments; however, other embodiments are possible.

Of the two supply containers, polyol and isocyanate, only the polyol supply container is represented in FIG. 1. The supply container 1 is provided with a stirring device 2 which operates constantly in order to maintain the contents in a homogeneous condition. In order that a gas cushion 3 can be present in supply container 1, and in order that an admission pressure of 4 bar can be obtained, it is connected to a compressed air system 6 which is indicated by connection pipe 5 having a flap valve 4. A supply pipe 7 runs from supply container 1 via a metering pump 8 to a mixing head 9 which is also connected via supply pipe 10 to a supply container for the isocyanate component which is not represented. In addition a circulation pipe 11 runs from the supply container 1 via a hydrometer 12 and a continuous pump 13 with a drive 14 to the gas loading container 15 of gas loading unit 16. Gas pipe 21 runs from gas cushion 3 of supply container 1 via compressor 19 provided with a drive 18 and via flap valve 20 into gas cushion 17 in gas loading container 15. Gas return pipe 22 is also provided between gas loading container 15 and supply container 1. Gas loading container 15 also has flow breaker 23. An ejector mixer 24, which is located in gas loading container 15 is also a part of gas loading unit 16. Hollow shaft 25 of the ejector mixer, which is sealed from the contents of gas loading unit 16, is powered by drive 26. At its lower end the ejector mixer 24 is provided with impellers 27 which have gas exit openings 28. In the area of gas cushion 17, hollow shaft 25 has a gas opening 29. Below the fluid level a circulation pipe section 30 leads away from gas loading container 15 and opens into supply container 1, through which the gas loaded polyol is carried. Hydrometer 12 is coupled with a computer and control device 31 for the gas loading process which receives impulses corresponding to the measured pressure from a manometer 32 via an impulse lead 33 and impulses corresponding to the measured density via an impulse lead 34. An impulse lead 35 and an impulse lead 36 run from computer and control device 31 to drive 26 of ejector mixer 24 and to drive 18 of compressor 19, respectively. Materials are introduced into supply container 1 through filler neck 37. Supply pipe 7 and circulation pipe section 11 have stop valves 38 and 39, respectively.

Figure 2:
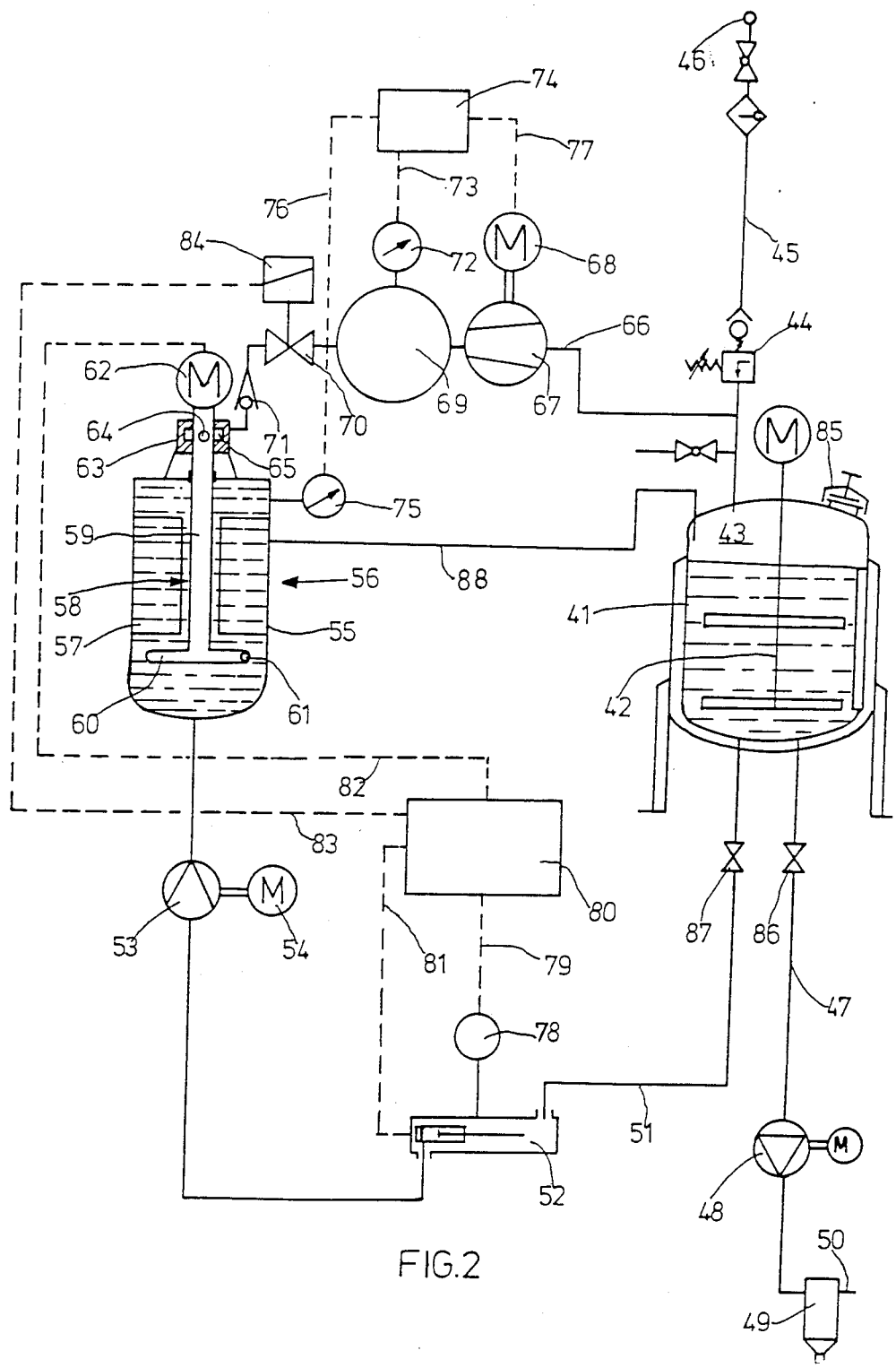
FIG. 2 shows a second embodiment of the present invention.

Again in FIG. 2, only the polyol supply container 41 is represented. Supply container 41 is equipped with a stirring device 42 which operates constantly in order to obtain the contents in a homogeneous condition. In order that gas cushion 43 can be present in supply container 41 and an admission pressure of 12 bar can be obtained, it is connected via a connection pipe 45 which has a flap valve 44 to compressed air network 46. A supply pipe 47 runs from supply container 41 via a metering pump 48 to a mixing head 49 which is also connected via supply pipe 50 to a supply container for the isocyanate component which is not represented. In addition, circulation pipe 51 runs from supply container 41 via a hydrometer 52 and continuous pump 53 with a drive 54 to the gas loading container 55 of a gas loading unit 56. Flow breaker 57 is also located in gas loading container 55 which is completely filled with polyol. An ejector mixer 58, which is also a part of gas loading unit 56, is located in gas loading container 55. At its lower end the ejector mixer 58 is provided with impellers 60 which have gas exit openings 61. Hollow shaft 59 which is sealed from the contents of gas loading container 55, is powered by a drive 62. Hollow shaft 54 has a gas intake opening 64 in the area of sliding seal case 63 which surrounds it and works together with a ring channel 65, also located in the sliding seal case 63. A gas pipe 66 which runs from gas cushion 43 of supply container 41 is connected with ring channel 65. This gas pipe also contains a compressor 67 with drive 68, an air chamber 69, a stop valve 70 with an on-off function and a reverse valve 71. A pressure manometer 72 is attached to air chamber 69 and also to pressure control device 74 by means of impulse lead 73. An impulse lead 76 runs from a second manometer 75 which is located on gas loading container 55 to pressure control device 74. This controls drive 68 of compressor 67 via impulse lead 77. Hydrometer 52 is provided with a manometer 78 and sends the measured pressure values to a computer and control device 80 via impulse lead 79. Device 80 also receives density values from hydrometer 52 via an impulse lead 81. An impulse lead 82 runs from computer and control device 80 to drive 62 of ejector mixer 58 and an impulse lead 83 runs to servomotor 84 of stop valve 70. Materials are introduced into supply container 41 through filler neck 85. Feed pipe 47 and circulation pipe 51 have stop valves 86 and 87, respectively. The polyol which has been loaded with gas from gassing container 55 is returned to supply container 41 via circulation pipe 88.

Figure 3:
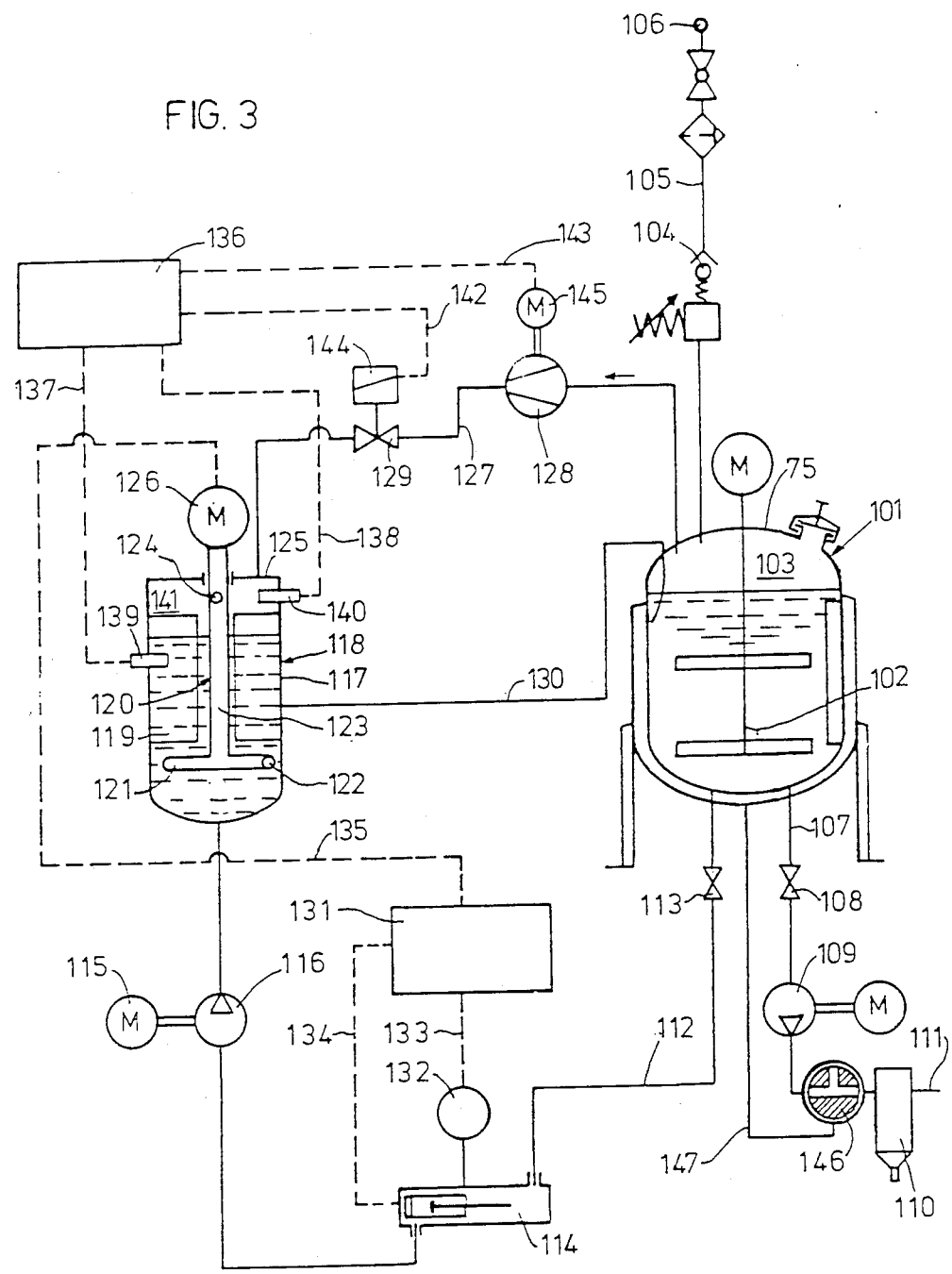
FIG. 3 shows a third embodiment of the present invention.

Again, in FIG. 3 only the polyol supply containers is represented. Supply container 101 is provided with a stirring device 102 which operates constantly in order to maintain the contents in a homogeneous condition. In order to maintain a gas cushion 103 in supply container 101 and an admission pressure of 12 bar, the supply container is connected to compressed air network 106, via connection pipe 105 which has flap valve 104. A feed pipe 107 runs from supply container 101 via a stop valve 108 and metering pump 109 to a mixing head 110, which is also connected via feed pipe 111 to the supply container for the isocyanate component which is not represented. In addition circulation pipe 112 runs from supply container 101 via stop valve 113, hydrometer 114 and circulation pump 116 having drive 115, to gas loading container 117 of gas loading unit 118. In gas loading container 117, which has flow breaker 119, an ejector mixer 120 is located, the wings 121 of which have exit openings 122. The hollow shaft 123 of ejector mixer 120 has a suction opening 124 below the upper container floor 125 and is connected with drive motor 126. A gas pipe 127 connected to gas cushion 103 of supply container 105 opens into the container upper floor 125. Compressor 128 and stop valve 129 are located in gas pipe 127. For the purpose of returning the gas loaded polyol, a circulation pipe 130 runs from gas loading unit 118 into supply container 101. Hydrometer 114 is coupled with a computer and control device 131 which receives pressure impulses from manometer 132 via impulse lead 133, and receives impulses corresponding to the measured density of the component via impulse lead 134. Impulse lead 135 runs from computer and control device 131 to drive 126 of ejector mixer 120. Impulse leads 137 and 138 run to level control device 136 from proximity switches 139, 140 which are located in gas loading container 117 in order to maintain the fluid level in gas loading container 117 between a minimum and a maximum. In this way a gas cushion 141 is maintained in gassing container 117 above the fluid level to provide ejector mixer 120 with gas. Impulse leads 142 and 143 run from level control device 136 to servometer 144 of stop valve 129 and to drive 145 of compressor 128. Reversing valve 146 is located in feed pipe 107 before mixing head 110 from which a circulation pipe 147 runs back into supply container 101.

The invention is further illustrated, but is not intended to be limited by the following examples.

EXAMPLES

Example 1

The device according to FIG. 1 is used. Supply container 1 has a volume of 0.75 m$^3$ and is filled three quarters full with polyol. Above this gas cushion 3 is situated. By means of the connection to the compressed air network 6 an admission pressure of 4 bar is maintained in supply container 1. By opening flap valve 4 when the pressure falls below this level, compressed air enters supply container 1 until flap valve 4, which has been set to that pressure, closes again. By means of stirring device 2 the polyol in supply container 1 is circulated constantly in order that the contents are maintained in a homogeneous condition. When stop valve 39 is open, circulation pump 13 pumps the polyol through circulation pipe 11 via hydrometer 12 into gas loading container 15 and via circulation pipe 30 into supply container 1 again. Gas loading container 15 has a volume of 0.02 m$^3$. Hydrometer 12 measures the density value under the prevailing pressure; this density value correlates to the level of gas loading. The level of pressure and the density value are fed into control device 31 by means of impulse leads 33 and 34. If the density value rises above the presel value which is pressure-dependent and stored in control device 31, then control device 31 gives a command to drive motor 26 by means of impulse lead 35 to activate e1-ector mixer 24. Compressor 19 which is located in gas pipe 21 is actuated by impulse lead 36 and takes air out of gas cushion 3 via gas pipe 21 into gas loading container 15, with the result that a gas cushion 17 is maintained at the pressure prevailing in gas loading container 15, i.e. 7 bar. Ejector mixer 24 draws air out of gas cushion 17 and disperses it into the polyol. Excess air which remains in gas cushion 17 flows through gas return pipe 22 into supply container 1 such that gas cushion 17 does not substantially increase in size. Any propellant which has escaped from the polyol into the air thus remains in circulation and is dispersed into the polyol again with the air.

Example 2

The device according to FIG. 2 is used. The process description conforms to that of Example 1 except for the explanation of the different gas loading process.

When stop valve 87 is open the component flows via circulation pipe 51 through hydrometer 52 and into gas loading container 52 via circulation pump 53. There it is enriched with air before returning to supply container 41 via circulation pipe 88. In this process the density is measured in hydrometer 52 and the pressure is measured using manometer 78; the measured values are fed into computer and control device 80 via impulse leads 81 and 79 and compared with a preset target density value which is pressure-related. If the density is higher than the preset value, computer and control device 80 gives a command to servomotor 84 via impulse leads 83 to open stop valve 70, and to drive 62 via impulse lead 82 to activate ejector mixer 58. Compressor 67 draws gas in from gas cushion 43 of supply container 41 which is maintained by compressed air system 46. Compressor 67 feeds the air into an air chamber 69. The internal pressure of air chamber 69 is kept at the same pressure as in gas loading container 55 as follows. The pressure value for gas loading container 55 is measured by manometer 75 and fed via impulse lead 76 into a pressure control device 74 which also obtains the value of the pressure in air chamber 69 via impulse lead 73 from manometer 72 which is located on air chamber 69. Pressure control device 74 compares these two values and, if the pressure in air chamber 69 is too low, activates drive 68 of compressor 67 and switches it off as soon as the desired pressure value is obtained. When the desired density and thus the desired gas loading are obtained by the gas loading of the polyol, then computer and control device 80 gives the command for stop valve 70 to be closed via impulse lead 82 and gives the command for drive 62 of ejector mixer 58 to be switched off via impulse lead 82. If the density value rises again to exceed the target value the gas loading process is repeated.

Example 3

The embodiment of the device according to FIG. 3 is used. Using flap valve 104 in supply container 101 a pressure of 12 bar is maintained by means of a compressed air system 106. Stirring device 102 operates constantly in order that the contents of the container are maintained in a homogeneous condition. Supply container 101 has a volume of 0.5 m³ and is filled until it is two thirds full with polyol. When isolating valve 113 is open pump 116 pumps the polyol into gas loading container 117 via circulation pipe 112, in which gas loading container a pressure of 15 bar is obtained and goes back into supply container 101 through circulation pipe 130. If the measured density is higher than the value preset in the computer and control device 131, drive 126 of ejector mixer 120 is activated via impulse lead 135 with the result that ejector mixer 120 draws gas in and disperses it into the polyol. If the fluid level in gas loading container 117, which has a volume of 0.01 m³, reaches proximity switch 140, the levelling device 136 receives a signal via impulse lead 138 and gives commands via impulse leads 142 and 143 for the opening of stop valve 129 and for the activation of drive 145 of compressor 128. If the fluid level falls to proximity switch 139 the levelling device 136 receives a signal via impulse lead 137 and gives commands for the closing of stop valve 129 via impulse lead 142 and for switching off drive 145 via impulse lead 143.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for introducing a gas into one of at least two free-flowing components which are subsequently mixed to provide a foam-forming, free-flowing mixture which comprises
   (a) introducing said one free-flowing component into a supply container,
   (b) maintaining a gas cushion in said supply container above the level of said one free-flowing component,
   (c) pumping said one free-flowing component from said supply container to a gas loading area comprising a container having gas dispersing means,
   (d) dispersing gas in said one free-flowing component via said gas dispersing means,
   (e) pumping said one free-flowing component from said gas loading area to said supply container,
   (f) transporting gas for said gas dispersing means from said gas cushion to said gas loading area and
   (g) compressing said gas during said transporting of step (f) to a higher pressure than the pressure in said gas loading area.

2. The process of claim 1 which comprises maintaining a gas cushion in the container of said gas loading area to supply gas to said gas dispersing means.

3. The process of claim 2 which comprises returning any excess gas which has not been dispersed from said gas loading area to said supply container.

4. The process of claim 2 which comprises maintaining the liquid level in the container of said gas loading area between defined limits.

5. The process of claim 1 which comprises providing a tank for storing said compressed gas from step (g) before it passes to said gas loading area.

* * * * *